US008473339B1

(12) United States Patent
McKennon et al.

(10) Patent No.: US 8,473,339 B1
(45) Date of Patent: Jun. 25, 2013

(54) AUTOMATICALLY SWITCHING BETWEEN PRICING MODELS FOR SERVICES

(75) Inventors: Wendy R. McKennon, San Francisco, CA (US); Bhavesh R. Mehta, Cupertino, CA (US); Dustin S. Jackson, Santa Monica, CA (US); Abhinay Sharma, Los Altos, CA (US); Scott S. Benson, Sunnyvale, CA (US); Andrew E. Silverman, New York, NY (US); Dan Siroker, Palo Alto, CA (US); Robert Kniaz, San Francisco, CA (US); Nicholas C. Fox, San Francisco, CA (US); Markus Mock, Cupertino, CA (US); James A. Gallagher, Mountain View, CA (US); Benjamin A. Hardy, Venice, CA (US); Mark K. Rose, Los Altos, CA (US); Kai Chen, Brisbane, CA (US); Joerg Heilig, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/559,137

(22) Filed: Jul. 26, 2012

Related U.S. Application Data

(63) Continuation of application No. 12/262,737, filed on Oct. 31, 2008.

(60) Provisional application No. 60/989,108, filed on Nov. 19, 2007.

(51) Int. Cl.
*G06Q 30/00* (2012.01)

(52) U.S. Cl.
USPC .................................................. 705/14.1

(58) Field of Classification Search
USPC ........................................................ 705/14.1
See application file for complete search history.

(56) References Cited

U.S. PATENT DOCUMENTS

| 5,933,817 | A | 8/1999 | Hucal |
| 7,792,743 | B2 | 9/2010 | Koningstein et al. |
| 2007/0233556 | A1* | 10/2007 | Koningstein .................. 705/14 |
| 2008/0255921 | A1 | 10/2008 | Flake et al. |
| 2008/0275757 | A1 | 11/2008 | Sharma et al. |
| 2010/0293054 | A1 | 11/2010 | Lieberman |

OTHER PUBLICATIONS

Google Inc. "New CPA bidding product available," Inside AdWords, Google's official blog for news, information and tips on AdWords, posted Sep. 24, 2007 at 12:17pm [online] [retrieved on Nov. 19, 2007]. Retrieved from the Internet: URL:http://adwords.blogspont.com/2007/09/new-cpa-bidding-product-available.html, 1 page.

* cited by examiner

*Primary Examiner* — Daniel Lastra
(74) *Attorney, Agent, or Firm* — Fish & Richardson P.C.

(57) ABSTRACT

Methods, systems, and apparatus, including computer program products, that can include receiving from an advertiser a request for billing based on a first measure of services, determining from quality data related to the advertiser whether the first measure of services can be converted with sufficient confidence to a second measure of services, providing services according to the first measure of services, monitoring stability data indicative of the stability of the relationship between the first measure of services and the second measure of services, and automatically switching from one to another mode of determining a price to be charged the customer for services provided.

20 Claims, 3 Drawing Sheets

AUTOMATICALLY SWITCHING BETWEEN PRICING MODELS FOR SERVICES

CROSS-REFERENCE TO RELATED APPLICATIONS

This application is a continuation of U.S. application Ser. No. 12/262,737, titled "Automatically Switching Between Pricing Models for Services" filed Oct. 31, 2008, which claims priority to U.S. Provisional Application Ser. No. 60/989,108, titled "Automatically Switching Between Pricing Models for Services" filed Nov. 19, 2007, the disclosures of each are incorporated herein by reference in their entireties.

BACKGROUND

The subject matter of this specification relates to digital data processing in providing services to customers that will be acted on by users and charging customers for those services.

Interactive forms of mass communication (e.g., the Internet) have great potential for improving the targeting of advertisements ("ads") to receptive audiences. For example, some web sites provide information search functionality that is based on keywords entered by users seeking information. A user query can be an indicator of the type of information of interest to the user. By comparing the user query to a list of keywords specified by an advertiser, it is possible to provide targeted ads to the user.

Another form of online advertising is ad syndication, which allows advertisers to extend their marketing reach by distributing ads to partners. For example, third party online publishers can place an advertiser's text or image ads on web properties with desirable content to drive online customers to the advertiser's web site. An example of a system that provides online advertising in these forms is AdSense™ offered by Google Inc. of Mountain View, Calif.

Web sites sometimes present ads on their web pages in the form of "banner ads"—i.e., in some cases a rectangular box that includes graphic components. When a user selects a banner ad by clicking on it, embedded hypertext links typically direct the user to the advertiser's web site. This process, in which the user selects an ad, is commonly referred to as a "click-through," which is a term that covers any form of user selection of an ad. The ratio of the number of click-throughs to the number of impressions of the ad (i.e., the number of times an ad is displayed) is commonly referred to as the "click-through rate" (CTR) of the ad.

In some online advertising systems, advertisers pay on a cost-per-impression (CPM) basis (e.g., cost-per-thousand impressions) to increase visibility and build brand awareness of their ads. The advertiser may pay a set rate each time an ad is shown. CPM prices are commonly negotiated for individual ads or ad campaigns with each publisher.

Some advertisers may desire to pay for their ads on a cost-per-click (CPC) basis. In a CPC system, advertisers may pay a set rate each time the consumer clicks on an ad. CPC systems are often associated with bidding markets, in which an advertiser bids against other advertisers for the cost of a click.

In other online advertising systems, advertisers may pay for their ads based on a cost-per-action (CPA) model in which the advertisers are charged based on qualifying actions. An action may be, for example, a sale or registration. A common type of action in a CPA model is a "conversion," which is said to occur when a user completes a transaction related to a previously served ad. What constitutes a conversion can be defined in a variety of ways. For example, it may be the case that a conversion occurs when a user clicks on an ad, is referred to the advertiser's web page or web property, and completes a purchase on that web page or web property. Alternatively, a conversion may be defined as a user being shown an ad, and making a purchase on the advertiser's web page or web property within a predetermined time (e.g., seven days). Many other definitions of what constitutes a conversion are possible. The ratio of the number of conversions to the number of clicks on the ad (i.e., the number of times an ad site is visited) is commonly referred to as the conversion rate.

An advertiser may find CPA desirable over CPC advertising because the advertiser finds CPA advertising to have lower business risk and less inaccuracy. For example, CPA pricing structure does not charge advertisers for clicks that do not convert into a transaction of a particular kind, and may not be as susceptible to "click fraud" as CPC advertising is. An advertiser may find CPA pricing desirable over CPM pricing as it is often difficult to accurately price CPM ads to reflect the true values of the ads to the advertisers. CPM-priced ads also require constant monitoring by the advertisers in order to determine the business effectiveness of the ads, e.g., by tracking rates of clicks, validity of click-throughs, number of click-throughs and conversions of clicks to purchases and/or other actions. Such monitoring may be less necessary in CPA advertising.

SUMMARY OF THE INVENTION

In general, one aspect of the subject matter described in this specification can be embodied in methods that provide a user interface for an advertiser to request billing on a cost-per-conversion (CPA) basis (e.g. cost-per-conversion). Through the user interface, a request is received for an advertising service to place advertising placements and to bill the advertiser on a cost-per-conversion basis. The method then determines from quality data related to the advertiser that the advertiser qualifies for billing on a cost-per-conversion pricing model. The advertising service provides advertising placements of the advertiser to a publisher. The advertiser is billed on a cost-per-conversion pricing model in accordance with the request of the advertiser. Stability data is monitored, and when a first stability index derived from the stability data falls below an exit threshold, the methods automatically switch billing for the advertising placements from the cost-per-conversion pricing model to an alternative pricing model. In some implementations, the methods notify the advertiser that billing has been automatically switched from the cost-per-conversion pricing model to an alternative pricing model. Other embodiments of this aspect include corresponding systems, apparatus, and computer program products.

In general, another aspect of the subject matter described in this specification can be embodied in methods that provide for a service provider to allow a customer to request billing for services as generally described above. When an advertiser does not initially qualify for pricing on a cost-per-conversion basis, an entrance threshold is established, and the advertiser is billed on an alternative pricing model. Stability data is monitored, and when a first stability index rises above the entrance threshold, billing is automatically switched from the alternative pricing model to a cost-per-conversion pricing model. In some implementations, the methods may notify the advertiser that billing has been automatically switched from the alternative pricing model to a cost-per-conversion pricing model. Other embodiments of this aspect include corresponding systems, apparatus, and computer program products.

In general, another aspect of the subject matter described in this specification can be embodied in methods that provide for a service provider to allow a customer to request billing for services based on a first measure of services, the first measure being derived from a first type of user action, wherein the customer is obligated to pay for services based on the occurrences of the first type of user action. The methods determine, such as from quality data related to the customer, whether the customer's first measure of services can be converted with sufficient confidence to a second measure of services, the second measure being derived from a second type of user action that is different from the first type of user action. If the first measure of services can be converted with sufficient confidence to the second measure of services, the customer is billed in accordance with the first measure of services. Services are provided to users for the customer. Stability data is monitored. This stability data is indicative of whether the first measure of services can be converted with sufficient confidence to the second measure of services. When the first measure of services cannot be converted with sufficient confidence to the second measure of services, the methods automatically switch billing from the first measure of services to the second measure of services. In some implementations, the second measure of services is used internally by the service provider. Other embodiments of this aspect include corresponding systems, apparatus, and computer program products.

In general, another aspect of the subject matter described in this specification can be embodied in methods that request advertising placements to be placed by an advertising service, the advertising placements to be billed to an advertiser on a first measure of services. The first measure of services can be derived from a first type of user action, wherein the advertiser has an obligation to pay for the services based on occurrences of the first type of user action. Billing can be received based on the first measure of services. Notification can be received of automatic switching of billing for the advertising placements from the first measure of services to a second measure of services.

One or more of the following additional features may also be included. An advertiser can be notified of automatic switching of billing for advertising placements from a cost-per-conversion pricing model to an alternative pricing model, or from the alternative pricing model to the cost-per-conversion pricing model. Also, an exit threshold can be established, and a reentrance threshold can be established after determining from quality data that the advertiser qualified for billing on a cost-per conversion pricing model. Stability data related to the advertiser can be monitored, and billing can be automatically switched from an alternative pricing model to the cost-per-conversion pricing model when a second stability index derived from the stability data rises above the reentrance threshold. Billing can be automatically switched from the cost-per-conversion pricing model to the alternative pricing model when the second stability index falls below the exit threshold. The alternative pricing model can be a cost-per-click pricing model or a cost-per-impression pricing model. An advertiser can qualify for billing on a cost-per-conversion pricing model when quality data related to the advertiser satisfies a quality index threshold. Quality data can be the same as stability data, a quality index threshold can be equal to the reentrance threshold, and the reentrance threshold can be greater than the exit threshold.

Quality data can include representing one or more of the following kinds of information: number of conversions in a recent time period, a conversion being a user action in response to an advertising placement provided by the advertising service; historical conversion experience of the advertiser; historical consistency of a conversion rate, the conversion rate being a rate at which advertisements are converted to conversions; conversion rate of the advertiser in a recent time period; historical effectiveness of the advertising service at predicting conversion rate; history of fraud by the advertiser; amount the advertiser has previously spent on advertising with the advertising service; amount the advertiser offers to spend per conversion with the advertising service; length of time the advertiser has been buying advertising placements from the advertising service; a credit rating of the advertiser; demographics of targeted users of the advertiser; historical geographic distribution of clicks and conversions, a click being a user selection of an advertising placement; and quality of landing page, a landing page being a page displayed to a user upon user selection of an advertising placement.

Stability data can include data representing one or more of the following kinds of information: changes in conversion rate, a conversion rate being a rate at which advertisements are converted to conversions; events in a market of the advertiser; changes in content of advertising placements; changes in landing page, a landing page being a page displayed to a user upon user selection of an advertising placement; changes in keywords associated with the advertising placements; and divergence from known patterns of conversion.

An advertiser can be notified of automatic switching of billing from the first measure of services to the second measure of services. The second measure of services can be used for processing the request of the advertiser for advertising placements and can be used to compare bids in an auction for an advertising space.

DETAILED DESCRIPTION

Advertising System Overview

Figure 1:
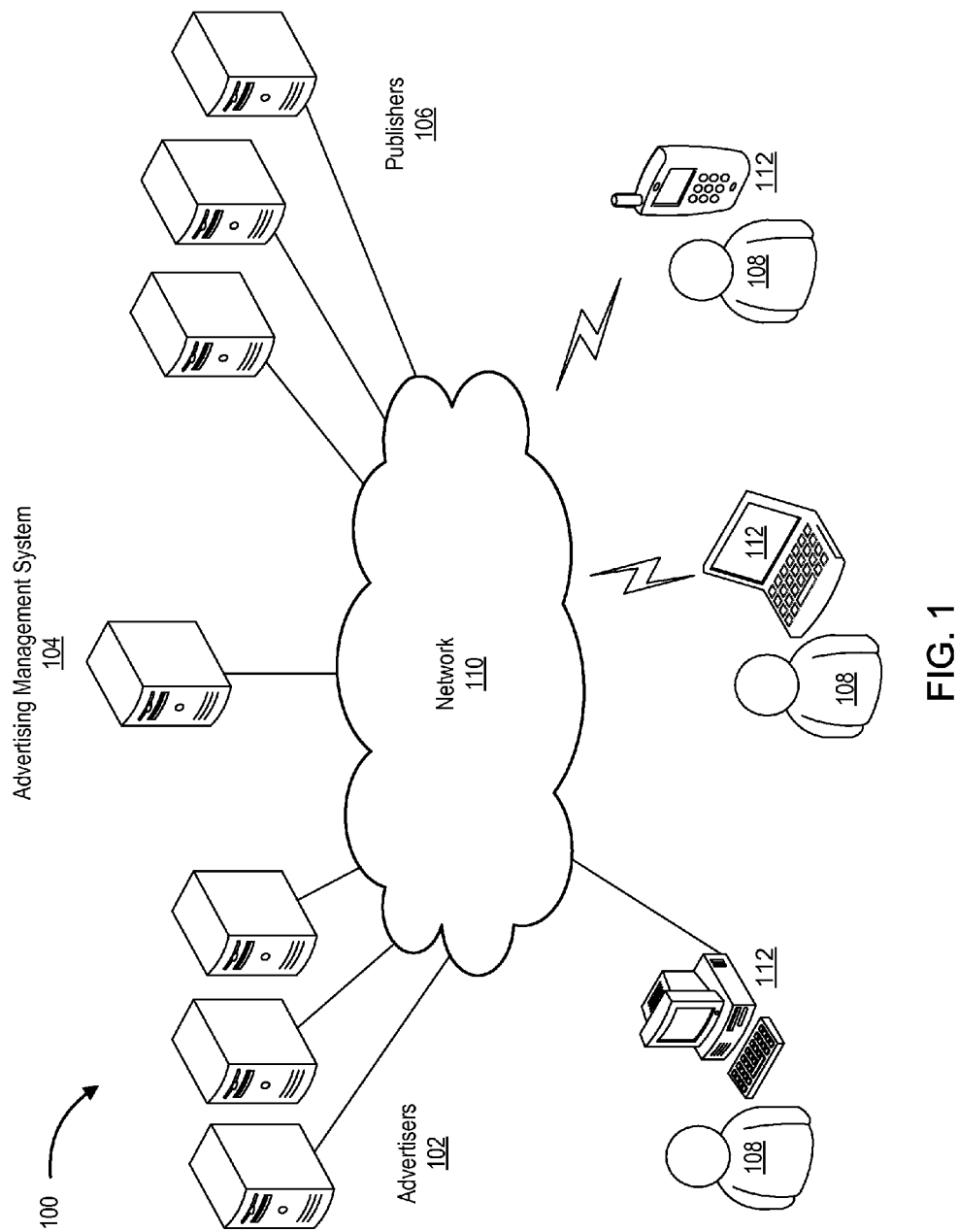
FIG. 1 is a block diagram showing an example of an online advertising system 100.

FIG. 1 is a block diagram showing an example of an online system 100 in which advertising services are provided. In some implementations, one or more advertisers 102 can, directly or indirectly, enter, maintain, and track ad information in an advertising management system 104. The ads may be in any form, including, for example, graphical ads, such as banner ads, text only ads, image ads, audio ads, video ads, printed ads, or ads combining one of more of any of such components. The ads may also include embedded information, e.g., links, meta-information, or machine executable instructions. One or more publishers 106 may submit requests for ads to the advertising management system 104. For convenience, the terms "advertiser" and "publisher" are used in this context to refer to both the people operating the advertising or publishing entities, respectively, and the computer-based systems belonging to the entities that interact with other parts of the online system. The advertising management system 104 responds by sending ads to the requesting publishers 106 for placement on publishers' web properties (e.g., web sites and other network-distributed content), where they will be viewed by users 108 using user interface devices 112 that are in communication with the publishers' web properties to receive content and then present it to the users 108.

Other entities, such as users 108, client programs running on the user interface devices 112, and the advertisers 102, can provide usage information to the advertising management system 104, such as, for example, whether or not a conversion or click-through related to an ad has occurred. This usage information can include measured or observed user behavior related to ads that have been served. The advertising management system 104 performs financial transactions, such as crediting the publishers 106 and charging the advertisers 102 based on the usage information.

A data communication network 110, e.g., a local area network (LAN), wide area network (WAN), the Internet, or a combination of them, allows the advertisers 102, the system 104, the publishers 106, and the users 108 to communicate with each other. The network 110 can facilitate wireless or landline communication between each entity. The network 110 may include all or a portion of an enterprise or secured network. While illustrated as a single network, the network 110 may be a continuous network logically divided into various sub-nets or virtual networks.

One example of a publisher 106 is a general content server that receives requests for content (e.g., articles, discussion threads, music, video, graphics, search results, or web page listings) and retrieves the requested content in response to, or otherwise responds to, the request. The content server can submit a request for ads to the system 104. Such an ad request may indicate how many ads are desired. The ad request may also include content request information. This information may include the content itself (e.g., a web page), a category of the content or the content request (e.g., arts, business, computers, arts-movies, arts-music, etc.), part or all of the content request, content age, content type (e.g., text, graphics, video, audio, mixed media, etc.), geographic location information, and so on.

The content server may combine the requested content with one or more of the advertisements provided by the system 104. This combined information including the content and one or more advertisement is then forwarded for presentation to the user 108 that requested the content. Finally, the content server may transmit information about the ads and how, when, and/or where the ads are to be rendered (e.g., position on the web page, click-through or not, impression time, impression date, size, or conversion or not) back to the system 104. Alternatively, or in addition, such information may be provided back to the system 104 by the user interface device 112 receiving the content.

Another example of a publisher 106 is a search engine. A search engine receives search queries. In response, the search engine generally retrieves relevant search results (e.g., from an index of web pages). An exemplary search engine is described in S. Brin and L. Page, "The Anatomy of a Large-Scale Hypertextual Search Engine," Seventh International World Wide Web Conference, Brisbane, Australia, and in U.S. Pat. No. 6,285,999. Such search results may include, for example, lists of web page titles, snippets of text extracted from those web pages, and hypertext links to those web pages, and may be grouped into a predetermined number of (e.g., ten) search results.

The search engine may submit a request for ads to the system 104. The request may include how many ads are desired. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers), scores related to the search results (e.g., information retrieval ("IR") scores such as dot products of feature vectors corresponding to a query and a document, document quality ranking scores, e.g., PageRank scores, and/or combinations of IR scores and ranking scores), snippets of text extracted from identified documents (e.g., web pages), full text of identified documents, feature vectors of identified documents, and so on.

The search engine may combine the search results with one or more of the advertisements provided by the system 104. This is then forwarded for presentation to the user 108 that requested the content.

Finally, the search engine may transmit information about the ad and when, where, and/or how the ad was to be rendered (e.g., position on a web page, click-through or not, impression time, impression date, size, or conversion or not) back to the system 104. Alternatively, or in addition, such information may be provided back to the system 104 by some other means.

Advertising Management System Overview

Figure 2:
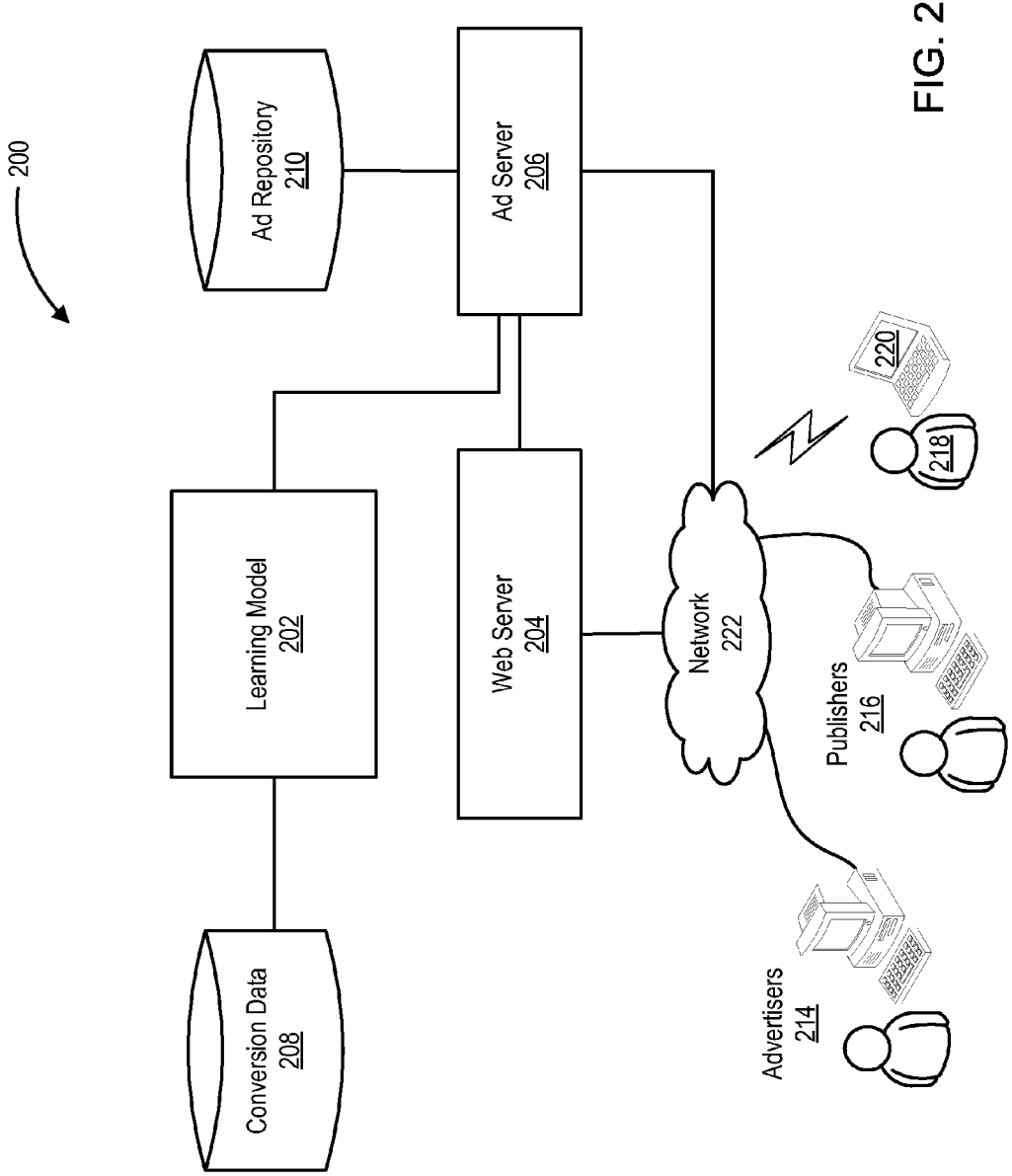
FIG. 2 is a block diagram of an implementation of an advertising management system 200 for implementing metric conversion.

FIG. 2 is a block diagram of an implementation of an advertising management system 200 for implementing metric conversion. In some implementations, the system 200 includes a learning model 202, a web server 204, an ad server 206, and an ad repository 210. The system 200 is operable to communicate with advertisers 214, publishers 216, and users 218 using user interface devices 220, over one or more data communication networks 222.

In some implementations, a publisher 216 can request an ad from the ad server 206. In response to the request, one or more ads (e.g., image ads) are sent to the publisher 216. The ads can be placed on one or more web pages or other content on a web property owned or operated by the publisher 216 (e.g., a web site). In some implementations, a publisher's web page can have a page content identifier (ID), which can be used by the ad server 206 to determine ad context for targeting ads. Such implementations target ads in the expectation that the users will be more receptive to targeted ads than to untargeted ads. In some implementations, the ad context is determined using clustering technology or geographic location data or both to identify a particular ad as sharing a context with other ads.

In some implementations, when the user 218 clicks an ad served by the ad server 206, the user 218 is directed to a landing page on the web property of the advertiser 214. The user 218 then can do something that the advertiser considers to be a conversion at the web site (e.g., make a purchase, register, view a video, or respond to a survey). As a result of a conversion, conversion data that describes the conversion is sent to the system 200 and stored in a conversion data repository 208. In this manner, a conversion history is accumulated and maintained for each ad or ad group in an advertiser's ad campaign. A system and method for tracking conversion data is described in commonly-owned U.S. Patent Application Publication No. 20050055269 A1, Ser. No. 10/653,899, for "System and Method of Determining User Actions," the disclosure of which is incorporated here by reference in its entirety.

In some implementations, the advertiser 214 can access the system 200 through the network 222 and the web server 204 using, for example, a web browser. The web server 204 serves the advertiser 214 one or more web pages that present a user interface allowing the advertiser 214 to interact with the web server 204 to manage ad campaigns.

The learning model 202, which can be coupled to the ad server 206 and the conversion data repository 208, may include a statistical and probability model constructed using statistical techniques. Such techniques may include, for example, logistic regression, regression trees, boosted stumps, or any other statistical modeling techniques. In some implementations, the learning model 202 provides a predicted conversion rate ("pCVR"), which can be used to perform a metric conversion.

In some implementations, the conversion data repository 208 includes one or more logical or physical memory devices configured to store a large data set (e.g., millions of instances and hundreds of thousands of features) that may be used, for example, to create and train the learning model 202. The data may include conversion data, advertisement information, such as advertisement data, user information, and document or content information, that may be used to create a model that may be used to determine a metric conversion rate. The advertisement data may include data relating to ads previously provided to users 218 and whether the ads were selected or not selected by the users 218. The user information may include Internet Protocol (IP) addresses, cookie information, languages, and/or geographical information associated with the users. The document information may include information relating to the documents accessed by the users 218, such as the Uniform Resource Locators (URLs) associated with the documents. Other types of data may alternatively or additionally be stored by the data repository.

Ad Campaign, Ad Slot, and Ad Placement Bidding

Referring back to FIG. 1, each advertiser 102 may establish an advertising program with the advertising management system 104. An advertising program may include, for example, ad campaigns, creatives, targeting, and the like. The advertiser 102 may define an ad campaign that includes one or more ad groups each including one or more ads. An ad group may define, for example, a product type (e.g., hats or pants); and a creative may include a textual or graphical ad for the product type. Each ad group or ad may have a start date, an end date, budget information, geographical targeting information, and syndication information. Other types of data may alternatively or additionally be stored with respect to the ad group or ad.

Each ad or ad group may include individual price information (e.g., cost, average cost, or maximum cost (e.g., per impression, per selection, or per conversion)). For example, the advertiser 102 may specify a maximum monetary value with the advertising management system 104 as to how much the advertiser 102 is willing to pay per user click, impression or conversion per ad or ad group. The maximum monetary value may be based on the number of impressions (e.g., CPM bidding), the number of clicks on an ad (e.g., CPC bidding), or the number of actions, such as conversions, generated in response to an ad (e.g., CPA bidding). For example, if the advertiser 102 has selected a CPC pricing model, the advertiser 102 can enter a maximum CPC bid which represents the highest amount the advertiser 102 is willing to pay if an ad associated with an ad group receives a click. As another example, if the advertiser 102 has selected a CPA pricing model, the advertiser 102 can enter a maximum CPA bid which represents the highest amount an advertiser is willing to pay if an ad associated with that ad group generates a conversion. Based on the defined pricing model, the publishers 106 can be credited and the advertisers 102 can be debited for each displayed ad.

When an ad request is received (e.g., submitted by a publisher or a web server hosting one or more actual web pages), an ad that corresponds to the received ad request is identified. If more than one ad has been identified, an auction can be conducted to determine which ad to serve. During the auction, the ads may be ranked in accordance with one or more associated ad campaign parameters. The one or more ad campaign parameters may include, without limitation, default bids (e.g., CPC, CPA, or CPM bids), daily budget defined by the advertisers 102 (e.g., at the time of registering an ad campaign), and relevance of an ad that can be determined by various methods, such as by inferring a high relevance for an ad with respect to, for example, a particular keyword query.

The advertisers 102 may, prior to an auction or at the time of registering an ad campaign, define ad campaign parameters or auction factors used for ranking ads. For example, an advertiser can enter a maximum CPM, CPC, or CPA bid for each ad group. The advertisers 102 also can use a combination of maximum CPM, CPC, and CPA bids within an ad group. For example, an advertiser can submit a maximum CPC bid for keyword-targeted placements and a maximum CPM bid for site-targeted placements.

In some implementations, the defined ad campaign parameters or auction factors are ranked. For example, the advertising management system 104 may select and rank the advertisers' default bids from highest to lowest. As another example, auction factors such as click-through rates (CTRs) and conversion rates (CVRs) can be ranked from largest to smallest.

Click-through rate (CTR) is one measure used to determine advertisement quality or effectiveness of an ad. The CTR of an ad can be calculated by dividing the number of click-throughs associated with the ad by the number of impressions of that ad over a given time period.

The conversion rate can be defined as:

$$\text{Conversion Rate} = \frac{\text{Number of Sales from a Given Ad}}{\text{Number of Clicks to Advertiser from the Ad}} \quad [1]$$

An ad campaign parameter or auction factor also can be weighted to increase or decrease the impact that auction factor has on ad ranking. For example, an ad that has a higher CTR can be ranked above an ad that has a lower CTR, even if the ad with the lower CTR has an equal or greater default bid.

The weight between various auction factors may be adjusted as desired, and other factors also may be included, in producing a weighted score for ranking each ad. Based on the ranking (and any adjustment thereof as a result of the weighted scores) determined during the auction, the identified ads can be selected for presentation. For example, if the identified ads are to be presented in a web page that has four ad slots each slot displaying one ad, the four highest ranked ads can be selected for presentation. Further, the ranking established during the auction can be used to determine a display order. For example, the highest ranked ad can be assigned to the most prominent display position.

As an example, assuming that there are three advertisers in an auction bidding for an ad placement in an ad slot where advertiser "A" has a maximum CPA bid of $15.00 for a text ad, advertiser "B" has a maximum CPA bid of $10.00 for a text ad, and advertiser "C" has a maximum CPA bid of $20.00 for a text ad, then the winner of the auction can be determined by converting the maximum CPA bids to an estimated CPM ("eCPM") level and comparing the results to CPM bids. A maximum CPA bid may be converted to an eCPM by aggregating the CPC bid with a predicted click-through rate (pCTR) and a predicted conversion rate (pCVR) multiplied by 1000, as can be generally given by [2]:

$$eCPM_{CPA} = 1000 \times pCTR \times pCVR \times CPA_{BID} \quad [2]$$

The product of the CPC bid is multiplied by a factor of 1000 so as to normalize the product of the CPA bid, the pCVR, and the pCTR to a cost value per one thousand impressions. In some implementations, the pCTR may be derived by the learning model 202 using historical data (e.g., conversion data).

For advertisers who define a maximum CPM bid instead of a maximum CPA bid, the eCPM is the same as the CPM bid, as generally given by [3]:

$$eCPM_{CPM} = CPM_{BID} \quad [3]$$

For example, if an advertiser specifies a CPM bid of $5 per thousand impressions, then the eCPM is also $5.

The advertising management system 104 may, in some implementations, provide a recommended CPA bid to the advertisers 102. The advertisers 102 may use the recommended CPA bid as a CPA bid for each of the advertiser's ad groups instead of a maximum CPC bid or a maximum CPM bid. Alternatively, the advertisers may use the recommended CPA bid to compute a CPA bid. Generally, advertisers may prefer the selection of a CPA bid over maximum CPC bid and maximum CPM bid because in CPA pricing advertisers are charged only for click-throughs that convert.

To compute the eCPM as a function of a CPA bid, the CPA bid may be defined as a function of a current CPC bid and a conversion rate. As an example, if an advertiser currently has a maximum CPC bid of $0.30 and a conversion rate of 5% of click-throughs, the CPA bid would be $6.00 ($6.00=$0.30/5%). In practice, the advertiser's maximum CPC bids will typically vary from ad to ad and from keyword to keyword for a single ad. In such cases, the CPA bid can be computed using the following formula:

$$CPA = \frac{\sum_{i=1}^{N} CPC_i}{\sum_{i=1}^{M} Conversion_i} \quad [4]$$

where the numerator of [4] is the sum of the actual prices paid for each click over "N" CPC bids for all the clicks that an advertiser received during a relevant period of time (e.g., over the past month), and the denominator of [4] is the total number of "M" conversions that resulted from these clicks. While the preceding description refers to maximum CPC bids, other CPC bids such as target CPC bids, average CPC bids and minimum CPC bids can also be used.

The advertisers 214 may, in some implementations, be able to specify both a default click-based bid (e.g., maximum CPC) and a bid (e.g., CPA bid) for each keyword or ad group in an ad campaign. The default maximum CPC bid can be used to predict a conversion rate for an ad or ad group when conversion data 208 is not available or is insufficient to do so (e.g., due to a new ad or ad group). For example, a conversion rate can be estimated by dividing a default maximum CPC bid by a CPA bid. Alternatively, the default maximum CPC bid can be used as default instead of predicting a conversion rate when there is insufficient information to do so.

In some implementations, the bid specified by the advertisers 214 may be provided by the ad server 206 to the learning model 202 where the bid can be combined with a predicted conversion rate to produce a new or adjusted maximum CPC bid. The learning model 202, for example, can be used to compute the pCVR for a potential ad impression by collecting the number of clicks and conversions for each impression context feature of interest. As discussed above, a conversion rate defines a ratio of the number of conversions (e.g., number of sales generated by a given ad) to the number of clicks of the ad (i.e., number of visits to advertiser's web property from the ad). Thus, statistics can be calculated based on these numbers for use in predicting a conversion rate. Once the pCVR is determined, this parameter may be used with the bid (e.g., multiplied by the bid) to automatically adjust the advertiser's default click-based bid (e.g., maximum CPC bid) or compute a new click-based bid.

In some implementations, the learning model 202 is a machine learning system model that includes rules for mapping impression context features to conversion rate predictions. The rules may include, for example, a probability multiplier for each context feature. For example, a user from the USA may be assigned a probability multiplier of 0.85, and an ad appearing on a particular news web site may be assigned a probability multiplier of 1.1. To predict a conversion rate, the default conversion rate can be aggregated with the probability multiplier for each relevant feature. Using the above example, for an ad having a default conversion rate of 0.2% that is shown on the particular news web site to a user from the USA, the predicted conversion rate for the ad would be 0.187% (0.2%×1.1×0.85).

Techniques for deriving rules from conversion data using machine learning systems are described in U.S. Patent Publication No. 20070156887 A1, Ser. No. 11/321,046, for "Predicting Ad Quality," the disclosure of which is incorporated here by reference in its entirety.

In some implementations, the pCVR can be used to compute or adjust an advertiser's click-based bid (e.g., Max CPC bid). For example, if the CPA bid specified by an advertiser is $50 and the predicted conversion rate is 2%, then the maximum CPC bid can be automatically adjusted to $1 using the following formula:

$$MaxCPC(adjusted) = CPA_{BID} \times pCVR \quad [5]$$

If there is insufficient conversion data available to compute the pCVR, then the advertiser's specified default maximum CPC bid can be used as a metric, until sufficient conversion data has been gathered for the ad, at which time [5] can be used to automatically compute or adjust the maximum CPC bid. During the course of an ad campaign, the conversion data 208 (and optionally the learning model 202) can gradually change over time as more data is accumulated, while the impression context varies from auction to auction. These changes can result in the calculation of a new pCVR. The new pCVR can then be used in [5] on-the-fly so that the advertiser's default maximum CPC bid can be automatically and continuously computed or adjusted during an ad campaign or auction.

Based on [5], an expected CPM can be computed from a predicted click-through rate (pCTR), predicted conversion rate (pCVR) and maximum CPA bid. The expected CPM can be used to determine winning bids in an ad auction that ranks ad effectiveness using a suitable metric. For example, the performance of an ad can be measured by an estimated or effective cost-per-one thousand impressions (eCPM) of the ad. That is, the performance of an ad can be measured by the amount of revenue generated by presenting the ad to users one thousand times. The eCPM may be computed as a function of CPA bid by replacing the term $CPC_{BID}$ in [2] with a CPC bid defined in [5] to produce [6]:

$$eCPM_{CPA} = 1000 \times pCTR \times pCVR \times CPA_{BID} \quad [6]$$

Equation [6] quantifies how the publishers 216 may be credited for each conversion with the CPA bid specified by the advertisers 214. While pricing according to equation [6] reduces the risks assumed by the advertisers who are allowed to bid and pay using a CPA pricing model, this approach may be unattractive to the publishers. Particularly, if the publishers are compensated only when conversions take place, the publishers are taking additional business risk in relation to being compensated based on the number of clicks or impressions. Even if in the aggregate the net payments for the publishers in both models are the same (compensated by conversions or compensated by the number of clicks), the publishers may prefer to be compensated based on the number of clicks because of the low variability involved in CPC or CPM pricing. Accordingly, in some implementations, an estimated CPC bid (eCPC) as a function of CPA bid may be determined based on predictive data (e.g., predicted conversion rate). The eCPC parameter can be used to develop a model that can be used to charge the advertisers on a CPA basis while crediting the publishers on a CPC basis.

To compute the eCPC for a CPC ad, it should be understood that the eCPC indicates an effective or estimated CPC bid. In an ideal market, the effective or estimated CPC bid should be the actual CPC bid specified by the advertisers. Given this relationship, the CPC bid term as defined in equation [2] may be treated as the eCPC:

$$eCPM_{cpc} = 1000 \times pCTR \times CPC_{BID} \quad [7]$$

$$eCPM_{CPC} = 1000 \times pCTR \times eCPC \quad [8]$$

Based on equation [6], the eCPC as defined in equation [8] can be determined as follows:

$$eCPC = \frac{eCPM_{CPC}}{1000 \times pCTR} \quad [9]$$

$$eCPC = pCVR \times CPA_{BID} \quad [10]$$

Using equation [10] allows publishers 216 to be compensated as a function of clicks while advertisers 214 are billed as a function of conversions. In short, a CPA ad can be valued in real time to determine an equivalent CPC ad at serving time. When users click on an ad, the data associated with the click (including any conversion data) is received in real time. The publishers may be compensated by the number of clicks regardless of whether the users end up converting, while the advertisers 214 can be charged as a function of conversions. This approach effectively creates incentives for publishers to participate in CPA advertising, because the publishers are not taking any additional risks or responsibilities beyond what is required by CPC pricing, and this can result in additional CPA ads being served to users 218. This approach also benefits the advertisers because the CPA advertising debits the advertisers only when a conversion is generated, and prevents charges against the advertisers on impressions or clicks that do not generate business.

With an ideal pCVR, payments expected to be credited to the publishers would be the same as the payments to be charged against the advertisers. However, in practical implementations where prediction conditions may change, the pCVR computed by the learning model 202 may not always match actual experience. The conditions may include various factors, such as, for example, insufficient or inconsistent conversion data. In some instances, these factors may cause the pCVR to over-predict or under-predict a conversion rate. The inaccuracy can lead to a deviation between the revenues generated by the publishers (i.e., eCPC) and those received from the advertisers. For example, if the pCVR is over-predicted (e.g., from 0.1% to 0.2%), then a publisher may be credited at a higher cost per click than an actual cost for each displayed ad. As another example, if the pCVR is under-predicted (e.g., from 0.1% to 0.05%), the publisher may be compensated less revenue than the publisher should have been entitled to.

To compensate for this pCVR deviation, in some implementations, a correction factor $\gamma$ that is adaptive to the deviation or fluctuation of the predicted conversion rate may be computed and incorporated in [10]. The eCPC with the correction factor $\gamma$ can generally be given by [11]:

$$eCPC = pCVR \times CPA_{BID} \times \frac{1}{\gamma} \quad [11]$$

In some implementations, the correction factor $\gamma$ in [11] may be computed (e.g., by the learning model 202) using an iterative process (e.g., a feedback loop) that compensates for the deviation error of the pCVR within a bidding period. The iterative process may employ historical performance data to obtain an accurate eCPC. The correction factor $\gamma$ may be automatically adjusted in an adaptive way to mitigate changes or fluctuations of the predicted conversion rate so as to yield an accurate estimated CPC as a function of a CPA bid.

In some implementations, the iterations can be performed until a predetermined, dynamically determined, or other optimal value is reached for the correction factor. In certain implementations, a correction factor may be approximated (e.g., by the learning model 202) before iterations are performed, such as before a threshold number of iterations are performed. In other implementations, no further iteration is performed if the correction factor changes by less than a threshold amount after a particular iteration.

In some implementations, the correction factor $\gamma$ may be updated multiple times over a single bidding period, or updated over multiple periods. This feedback strategy can equalize any pCVR deviation. For example, if it is determined that the pCVR in a given bidding period over-predicts the actual conversion rate, then the correction factor $\gamma$ may be adjusted in a subsequent bidding period in a manner that would cancel out the discrepancies caused by the over-prediction (e.g., by incrementing or decrementing the correction factor $\gamma$ to compensate for the over-predicted CVR). Similarly, if it is determined that the pCVR in a given bidding period under-predicts the actual conversion rate, then the correction factor $\gamma$ may be adjusted in a subsequent period in a manner that would cancel out the discrepancies caused by the under-prediction (e.g., by incrementing or decrementing the correction factor $\gamma$ to compensate for the under-predicted CVR).

In some implementations, the correction factor $\gamma$ may generally be defined as:

$$\gamma = \frac{\alpha_{(CPC,t)}}{\beta_{(CPA,t)}} \quad [12]$$

where $$\alpha_{(CPC,t)} = \sum_t$$

Amount Paid To Publisher On A CPC Basis For CPA Ads and $$\beta_{(CPA,t)} = \sum_t$$

Amount Received From Advertiser For Conversions On CPA Ads

The parameter $\alpha_{(CPC,\,t)}$ represents an aggregate total paid to the publisher within a bidding period "t" and the parameter $\beta_{(CPA,\,t)}$ represents an aggregate total charged against the advertiser within the bidding period "t." The bidding period "t" may be defined in terms of the time of the beginning and end of a bidding period, and may be defined as a function of a number of impressions or clicks. For example, a bidding period "t" may have a threshold of 10 conversions or 100 clicks. As another example, a bidding period "t" may have a threshold of 50 conversions or 5000 clicks. In some implementations, the value of the bidding period "t" may be adjusted to allow stability of the parameters $\alpha_{(CPC,\,t)}$ and $\beta_{(CPA,\,t)}$.

The parameters $\alpha_{(CPC,\,t)}$ and $\beta_{(CPA,\,t)}$ may be based on the number of clicks, impressions, and cost accrued over the bidding period "t." These data, in some implementations, may be stored in the conversion data repository 208. In general, each bidding period "t" corresponds to a time interval between two bid updates. However, some intervals may not contain, for example, sufficient conversion data to reliably compute the correction factor γ (e.g., does not reach a predetermined data threshold of 5000 impressions for each 500 clicks). Thus, in some implementations, multiple consecutive periods can be aggregated into a single bidding period. In other implementations, the correction factor γ can default to one, and can be adjusted or re-evaluated once the data threshold has been reached, noting that the correction factor γ , on average, can approach to one as the number of advertisers and publishers increases (e.g., as the number approaches one million or above), which means that the payment to the publishers is consistent with the payment received from the advertisers.

After an initial pCVR is set, the correction factor γ can be periodically updated to compensate for potential pCVR deviation and to obtain an accurate eCPC for a next time period (e.g., an hour, a day, a week, etc.). The data used to determine the correct factor γ for a predefined period "t" may come from various sources. For example, when determining the parameters $\alpha_{(CPC,\,t)}$ and $\beta_{(CPA,\,t)}$, revenue per conversion, pricing model and bids, and click-through rate of an ad may be provided by the advertisers 102, while conversion rate information may be tracked by the advertising management system 104.

The bidding period "t" for which these parameters are measured can be empirically determined, or based on historical data. As an example, assuming that conversion data associated with a conversion is received and recorded (and learned by the learning model 202) within seven days, then the empirical bidding period may be set as seven days to allow the conversion data to be reflected in the parameters $\alpha_{(CPC,\,t)}$ and $\beta_{(CPA,\,t)}$. In some implementations, the bidding period "t" may be frequently or periodically adjusted to ensure that the difference between the parameters $\beta_{(CPA,\,t)}$ and $\alpha_{(CPC,\,t)}$ are optimally reduced. In other implementations, the bidding period "t" may be selected to ensure that an optimum number of data is available for determining the parameters $\alpha_{(CPC,\,t)}$ and $\beta_{(CPA,\,t)}$.

When the parameters $\beta_{(CPA,\,t)}$ and $\alpha_{(CPC,\,t)}$ are mathematically equivalent (i.e., indicating that the amount of payment received from an advertiser based on a CPA pricing model is consistent with the expected amount paid to a publisher on a CPC basis), then equation [12] would yield a correction factor γ of 1. In this instance, the eCPC would be equal to the predicted conversion rate pCVR multiplied by the CPA bid specified by the advertiser, signifying that the amount the publisher is paid is consistent with the amount the advertiser is charged.

When the parameter $\alpha_{(CPC,\,t)}$ is greater than $\beta_{(CPA,\,t)}$, then the correction factor γ is greater than 1. In this scenario, the amount of payment paid to a publisher on a CPC basis is greater than is consistent with the payment received from the advertiser based on a CPA pricing model. As a result, in a subsequent bidding period, the eCPC can be corrected by the term 1/γ so that the eCPC becomes smaller than a previous bidding period to compensate for the overpayment to the publisher. When the parameter $\alpha_{(CPC,\,t)}$ is less than $\beta_{(CPA,\,t)}$, then the correction factor γ is less than 1. In this scenario, the payment received from the advertiser based on a CPA pricing model is greater than is consistent with the amount of payment paid to a publisher on a CPC basis, which indicates that the publisher is underpaid. As a result, in a subsequent bidding period, the eCPC can be corrected by the term 1/γ so that the eCPC becomes greater than a previous bidding period to compensate for the underpayment to the publisher.

Automatic Switching of Pricing Model for Billing

Figure 3:
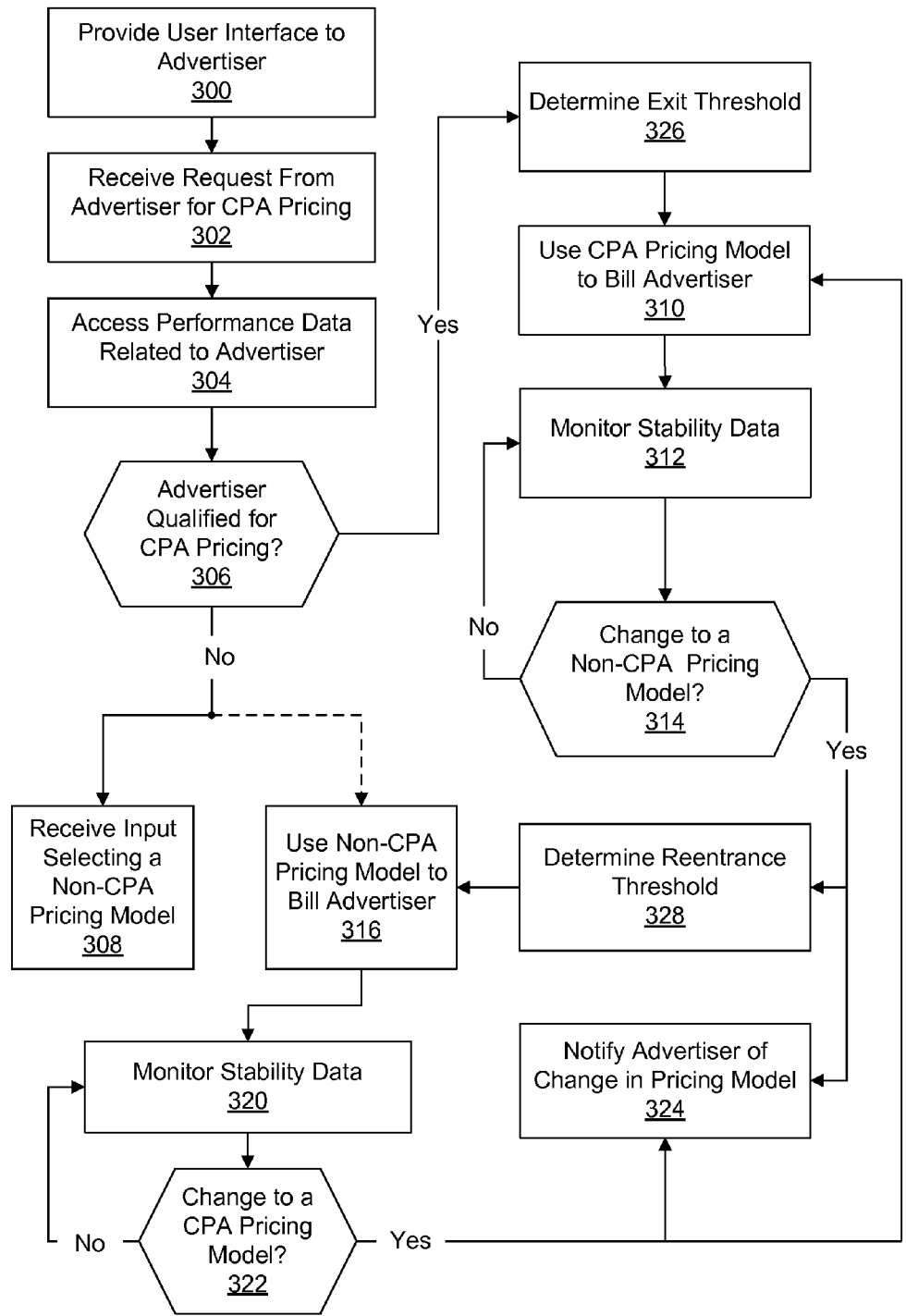
FIG. 3 is a flow chart illustrating by example a method for automatically switching a pricing model that determines the basis of prices charged for services provided a customer.

FIG. 3 is a flow chart illustrating by example a method for automatically switching a pricing model that determines the basis of prices charged for services provided to a customer.

An advertising service provides an advertiser with a user interface (step 300). The advertising service receives a request from the advertiser for advertising placements, and for the advertisements to be placed on a CPA pricing model (step 302). Quality data related to the advertiser is accessed (step 304). This quality data may include data representative of one or more of the following kinds of information: historical consistency of the conversion rate, number of conversions in a recent time period, historical effectiveness of the advertising service at predicting conversion rate, historical changes in the correction factor γ, magnitude of the correction factor γ, amount the advertiser has previously spent on advertising, amount the advertiser is willing to spend per conversion, length of time the advertiser has been a customer, a credit rating of the advertiser, demographics of the targeted users, historical geographic distribution of clicks and conversions, history of fraud by the advertiser, and quality of the landing page. The method determines whether the advertiser is qualified for CPA pricing (step 306). In making this determination, quality data is processed to generate a quality index representing the degree of risk associated with allowing a particular advertiser to use a CPA pricing model. If the quality index is below a predetermined quality threshold ("no" branch from step 306), the advertiser must select a non-CPA pricing model, such as CPC or CPM pricing (step 308). In alternative implementations, the advertising service establishes a non-CPA pricing model derived from the CPA bid submitted by the advertiser (step 316). If the quality index is above the predetermined quality threshold, the advertiser is permitted to use a CPA pricing model ("yes" branch from step 306). The quality data or index is optionally used to determine an exit threshold (step 326). The exit threshold is a lower limit of a stability index such that when a stability index of the advertising placements falls below the exit threshold, the pricing model for the advertiser is automatically changed to an alternative, less risky, non-CPA pricing model. In some implementations, the stability index and the quality index are the same. In some implementations, the quality threshold and the exit threshold are the same.

The quality index and the stability index can be determined in a variety of ways from the quality data. The indices can be determined manually or by use of statistical or machine learning techniques for estimating model parameters. In simple systems, the indices can be determined as a sum of terms, each of which is a product of a coefficient and the value of a corresponding quality data item. The coefficients can be determined manually or from statistical models built from historical data. Alternatively, the indices and thresholds can be embodied in a machine learning system that automatically determines when changes from one pricing model to another should occur.

The advertising service, which can be an advertising management system of the kinds described above, serves ads for the advertiser in accordance with the CPA pricing model (step 310) and bills the advertiser accordingly. Stability data related to the advertising placements requested by the advertiser is monitored (step 312). This stability data may include data representing one or more of the following kinds of information: changes in the conversion rate of the advertising placements, events in the advertiser's market, changes in the content of the advertising placements, changes in landing page, divergence from known patterns of conversion, and stability of advertiser inputs. The monitoring of stability data may occur continuously or on a periodic basis. The stability data is processed to generate a first stability index, which is checked to determine whether the first stability index has fallen below the exit threshold (steps 312, 314). This monitoring and checking may occur at regular intervals of time or usage of advertising services, or at some other regular or irregular intervals. When the first stability index drops below a predetermined lower threshold ("yes" branch from step 314), the system automatically switches from the CPA pricing model to a non-CPA pricing model. A notification of this change is sent to the advertiser soon after the change and/or in the ordinary course of billing notifications to the advertiser (step 324). Also, a reentrance threshold is determined (step 328). This can be done using one or more of the following data or information, described above: quality data, stability data, a quality index, or a stability index. Alternatively, the reentrance threshold can be a pre-determined fraction of the quality threshold, selected so that switches between the CPA and non-CPA pricing models do not occur too frequently.

The system establishes a non-CPA pricing model, e.g., a CPC or CPM pricing model (step 316). The stability data is monitored (step 320) to generate a second stability index. The monitoring of stability data may occur continuously or on a periodic basis.

When the second stability index rises above the reentrance threshold, the method automatically switches back from the non-CPA pricing model to the CPA pricing model ("yes" branch from step 322). A notification of the change is sent to the advertiser (step 324). The advertising service then operates in accordance with the CPA pricing model (step 310), as already described.

The process of automatic switching of pricing models may be repeated in response to rising and falling of the stability index.

In other implementations, once the advertiser has been disqualified from CPA pricing, the advertiser will use the alternative, non-CPA pricing model until the advertiser explicitly requests CPA pricing again, and no monitoring for requalification (steps 320, 322) is performed.

In other implementations, an exit threshold is determined each time the pricing model switches from non-CPA to CPA (after "yes" branch from step 322).

In other implementations, determining a reentrance threshold is performed only the first time the pricing model switches from CPA pricing to non-CPA pricing (after "yes" branch from step 314), or a reentrance threshold is a predetermined value.

In other implementations, if the advertiser is not initially qualified for CPA pricing, quality data is nevertheless monitored (after step 308) and the pricing model will switch to a CPA pricing model if the necessary conditions are satisfied as described above. The methods illustrated by FIG. 3 and described above can be used with services other than advertising. In alternative embodiments, they can be used in contexts where no bidding is involved, and the service provider offers multiple pricing models that have a different allocation of risk between the buyer, the manager or intermediary, and the seller of the services. In further alternative embodiments, they can be used by a seller where there is no intermediary such as the advertising management systems described above. Generally, the pricing models are distinguished by having different types of actions or events that trigger an obligation to pay, and accordingly different amounts due.

Thus, for example, the methods are applicable where different measures of services can be derived from different types of action. For example, a first measure of services could be derived from a time over which services are provided to a customer (e.g. minutes, hours, or days), and a second measure of services could be derived from a quantity of services used by the customer, e.g., a number of items provided. A vendor can bill the customer in accordance with the first measure but use the second measure of services internally, or to pay a supplier, if the first measure can be converted with sufficient confidence to the second measure.

Using the techniques described above, a service provider or intermediary can monitor the stability of the relationship between the first measure and the second measure. When the relationship becomes unstable, the service provider will transition from billing the customer in accordance with the first measure of services to billing in accordance with the second measure. This transition can take place immediately, as described above, or after some notification of the customer, as may be provided by agreement between the customer, on the one hand, and the service provider, on the other.

In some implementations, a system offers services in the context of an auction, and provides for switching between alternative payment modes. A payment mode includes a bid and a methodology for interpreting the bid (e.g., CPA, CPC, or CPM). Two payment modes are different if they differ in their bid amount, their interpretation methodology, or both. Thus, a cost-per-action (conversion) bid interpreted as requiring payment on conversion and a cost-per-action (conversion) bid interpreted as requiring payment on the occurrence of some number of clicks would be different payment modes, even when the monetary amount of the bid is the same in both cases. Such systems also implement one or more methods that determine when to switch between the two—or possibly more—modes based on context. The context can be defined by, or derived from, data internal to the system internal, external to the system internal, or both.

Thus, two different payment modes can be offered to a customer and managed on a system using the techniques described in this specification for offering and handling two different pricing models. For example, in one scenario, the system determines that a first payment mode is appropriate for bids occurring on Sunday and Monday, while a second payment mode is appropriate for all other days of a week. In another scenario, the system determines that particular kinds of ads are receiving a high click-through rate, indicating a high degree of interest in the kinds of products being offered; and the system switches to a payment mode offering a higher effective bid amount while the high degree of interest appears to exist.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a request from an advertiser requesting advertising placements for one or more advertisements of the advertiser to be placed with one or more publishers;
   determining that the advertiser qualifies for billing for advertising placements on a cost-per-conversion pricing model including evaluating a historical performance of one or more of the advertiser's advertisements;
   determining, by one or more data processors, whether a conversion of one of the advertiser's advertisements has occurred through an advertising placement with a publisher;
   in response to determining that the conversion has occurred:
      charging the advertiser for the conversion based on the cost-per-conversion pricing model; and
      compensating the publisher for the same conversion based on an alternative pricing model different from the cost-per-conversion pricing model.

2. The method of claim 1, further comprising:
   determining whether a selection or impression of one of the advertiser's advertisements has occurred through an advertising placement with the publisher;
   in response to determining that the selection or impression has occurred and that the conversion has not occurred:
   not charging the advertiser for the selection or impression; and
   compensating the publisher for the selection or impression based on the alternative pricing model.

3. The method of claim 2, wherein the alternative pricing model is a cost-per-selection pricing model.

4. The method of claim 2, wherein the alternative pricing model is a cost-per-impression pricing model.

5. The method of claim 1, further comprising:
   receiving data specifying a cost-per-conversion bid for the advertisement placements from the advertiser.

6. The method of claim 5, wherein compensating the publisher comprises:
   converting the cost-per-conversion bid to an alternative bid based at least in part on a predicted conversion rate for the one of the advertiser's advertisements; and
   compensating the publisher an amount equal to the alternative bid.

7. The method of claim 6, wherein compensating the publisher the amount comprises:
   compensating the publisher the amount regardless of whether a conversion of the one of the advertiser's advertisements occurs.

8. A computer-implemented method, comprising:
   receiving, at one or more processors, a request from an advertiser requesting advertising placements by an advertising service, the advertising placements to be billed on a cost-per-conversion pricing model;
   monitoring stability data related to the advertiser while billing the advertiser on the cost-per-conversion pricing model; and
   in response to a first stability index derived from the stability data satisfying an exit threshold, automatically switching billing for advertising placements from the cost-per-conversion pricing model to an alternative pricing model.

9. The method of claim 8, further comprising:
   notifying the advertiser of automatically switching billing for the advertising placements from the cost-per-conversion pricing model to the alternative pricing model.

10. The method of claim 8, further comprising:
    establishing a reentrance threshold after determining from quality data that the advertiser qualifies for billing on a cost-per-conversion pricing model; and
    monitoring the stability data related to the advertiser while billing the advertiser on the alternative pricing model and, when a second stability index derived from the stability data satisfies the reentrance threshold, automatically switching billing for the advertising placements from the alternative pricing model to the cost-per-conversion pricing model.

11. The method of claim 8, wherein the alternative pricing model is a cost-per-click pricing model or a cost-per-impression pricing model.

12. A system comprising:
    one or more data processors; and
    instructions stored on a computer storage apparatus that when executed by the one or more data processors cause the one or more data processors to perform operations comprising:
       receiving a request from an advertiser requesting advertising placements for one or more advertisements of the advertiser to be placed with one or more publishers;
       determining that the advertiser qualifies for billing for advertising placements on a cost-per-conversion pricing model including evaluating a historical performance of one or more of the advertiser's advertisements;
       determining whether a conversion of one of the advertiser's advertisements has occurred through an advertising placement with a publisher;

in response to determining that the conversion has occurred:
: charging the advertiser for the conversion based on the cost-per-conversion pricing model; and
: compensating the publisher for the same conversion based on an alternative pricing model different from the cost-per-conversion pricing model.

13. The system of claim 12, wherein the instructions, when executed by the one or more data processors, cause the one or more data processors to perform further operations comprising:
: determining whether a selection or impression of one of the advertiser's advertisements has occurred through an advertising placement with the publisher;
: in response to determining that the selection or impression has occurred and that the conversion has not occurred:
:: not charging the advertiser for the selection or impression; and
:: compensating the publisher for the selection or impression based on the alternative pricing model.

14. The system of claim 12, wherein the instructions, when executed by the one or more data processors, cause the one or more data processors to perform further operations comprising:
: receiving data specifying a cost-per-conversion bid for the advertisement placements from the advertiser.

15. The system of claim 14, wherein compensating the publisher comprises:
: converting the cost-per-conversion bid to an alternative bid based at least in part on a predicted conversion rate for the one of the advertiser's advertisements; and
: compensating the publisher an amount equal to the alternative bid.

16. The system of claim 15, wherein compensating the publisher the amount comprises:
: compensating the publisher the amount regardless of whether a conversion of the one of the advertiser's advertisements occurs.

17. A computer-readable storage medium having instructions stored thereon, which, when executed by one or more data processors, causes the one or more data processors to perform operations comprising:
: receiving a request from an advertiser requesting advertising placements for one or more advertisements of the advertiser to be placed with one or more publishers;
: determining that the advertiser qualifies for billing for advertising placements on a cost-per-conversion pricing model including evaluating a historical performance of one or more of the advertiser's advertisements;
: determining whether a conversion of one of the advertiser's advertisements has occurred through an advertising placement with a publisher;
: in response to determining that the conversion has occurred:
:: charging the advertiser for the conversion based on the cost-per-conversion pricing model; and
:: compensating the publisher for the same conversion based on an alternative pricing model different from the cost-per-conversion pricing model.

18. The computer-readable storage medium of claim 17, wherein the instructions, when executed by the one or more data processors, cause the one or more data processors to perform further operations comprising:
: determining whether a selection or impression of one of the advertiser's advertisements has occurred through an advertising placement with the publisher;
: in response to determining that the selection or impression has occurred and that the conversion has not occurred:
:: not charging the advertiser for the selection or impression; and
:: compensating the publisher for the selection or impression based on the alternative pricing model.

19. The computer-readable storage medium of claim 17, wherein the instructions, when executed by the one or more data processors, cause the one or more data processors to perform further operations comprising:
: receiving data specifying a cost-per-conversion bid for the advertisement placements from the advertiser.

20. The computer-readable storage medium of claim 19, wherein compensating the publisher comprises:
: converting the cost-per-conversion bid to an alternative bid based at least in part on a predicted conversion rate for the one of the advertiser's advertisements; and
: compensating the publisher an amount equal to the alternative bid.

* * * * *

UNITED STATES PATENT AND TRADEMARK OFFICE
CERTIFICATE OF CORRECTION

PATENT NO.         : 8,473,339 B1
APPLICATION NO.    : 13/559137
DATED              : June 25, 2013
INVENTOR(S)        : Wendy R. McKennon et al.

It is certified that error appears in the above-identified patent and that said Letters Patent is hereby corrected as shown below:

On the Title Page

Column 2, Item 56 (Other Publications), Line 4-5 – delete "adwords.blogspont.com" and insert -- adwords.blogspot.com --, therefor.

Signed and Sealed this
Tenth Day of September, 2013

Teresa Stanek Rea
*Acting Director of the United States Patent and Trademark Office*